June 4, 1968 P. D. COREY 3,387,229
FREQUENCY STABILIZED MAGNETICALLY COUPLED MULTIVIBRATOR
Filed Feb. 6, 1967
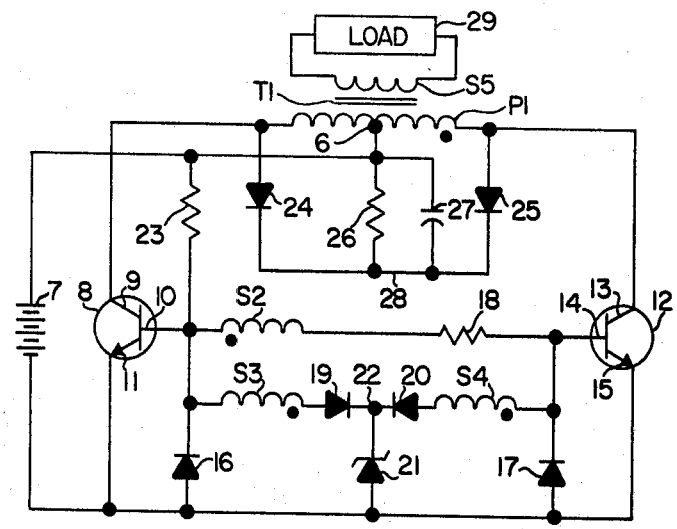
INVENTOR.
PHILIP D. COREY
BY
HIS ATTORNEY United States Patent Office 3,387,229
Patented June 4, 1968

3,387,229
FREQUENCY STABILIZED MAGNETICALLY
COUPLED MULTIVIBRATOR
Philip D. Corey, Crozet, Va., assignor to General Electric
Company, a corporation of New York
Filed Feb. 6, 1967, Ser. No. 614,313
5 Claims. (Cl. 331—113)

ABSTRACT OF THE DISCLOSURE

In order to provide an output signal from a magnetically coupled multivibrator which is relatively constant in frequency and amplitude where conditions may cause significant voltage supply variations, the necessity for a separate supply voltage regulator is obviated by providing additional transformer windings combined with a Zener diode to adjust automatically the base drive to the two multivibrator transistors by variably shunting appropriate amounts of the base drive current supplied by the conventional positive feedback winding.

---

The invention described herein was made in the performance of work under a NASA contact and is subject to the provisions of section 305 of the National Aeronautics and Space Act of 1958, Public Law 85–568 (72 Stat. 435; 42 U.S.C. 2457).

This invention relates to multivibrators and, more particularly, to magnetically coupled, solid state multivibrators.

A typical application of the magnetically coupled multivibrator is in power conversion. It is quite useful in converting relatively low DC voltages into relatively high AC voltages. The magnetically coupled multivibrator is sufficiently efficient to compete favorably with electromechanical chopper supplies, rotating inverters, dynamotors, and the like.

One characteristic of the simple magnetically controlled multivibrator is that the output frequency is approximately proportional to the input or supply voltage. In cases where a constant or controllable output frequency is desired, independent of supply voltage, the usual prior art approach has been to provide a series voltage regulator ahead of the magnetically coupled multivibrator such that its supply voltage is relatively constant.

It is one object of this invention to provide a magnetically coupled multivibrator which is frequency and voltage stabilized with respect to variable supply voltage conditions.

It is a more specific object of this invention to provide a magnetically coupled multivibrator including integral compensating means to achieve controllable drive to the circuit active elements when the supply voltage is subject to variation to achieve constant output voltage and frequency.

These objects are achieved, according to one embodiment of the present invention, by providing compensating windings within the multivibrator's magnetic circuit which tend to divert a portion of the normal feedback drive current to the multivibrator active elements which in turn are supplied from a conventional positive feedback winding. One end of each of the compensating windings is voltage stabilized by a Zener diode, and the compensating windings are isolated from one another by conventional diodes such that each controls the drive to only one of the active elements when that active element is "on."

The subject matter of the invention is particularly pointed out and distincly claimed in the concluding portion of the specification. The invention however, both as to organization and method of operation, may best be understood by reference to the following description taken in connection with the accompanying drawing which is a circuit diagram of a preferred embodiment of the invention.

Referring now to the single figure, a magnetically coupled multivibrator is illustrated which utilizes the present invention to achieve the integral frequency and voltage regulation. A transformer T1, preferably of the saturable core type, comprises several windings P1, S2, S3, S4, and S5. The winding P1 has a center tap 6 which is connected to the negative terminal of the DC voltage source 7, depicted as a battery in the single figure, and functions as a primary winding for the magnetic circuit. An NPN transistor 8 has a collector electrode 9 connected to one end of the primary transformer winding 1, a base electrode 10, and an emitter electrode 11 which is connected to the negative terminal of the DC voltage source 7. Another NPN transistor 12 has a collector electrode 13 connected to the opposite end of the primary transformer winding P1, a base electrode 14, and an emitter electrode 15 which is also connected to the negative terminal of the DC voltage source 7. A pair of rectifiers 16 and 17 have their anode electrodes connected to the negative side of the DC voltage source 7 and their cathode electrodes connected to the base electrodes 10 and 14 of the transistors 8 and 12, respectively.

The transformer secondary winding S2, which provides positive feedback drive current to the transistors 8 and 12, and a current limiting resistor 18 comprises a series circuit connected between the bases 10 and 14 of the transistor 8 and 12, respectively. Transformer secondary windings S3 and S4 are compensating windings. One end of the compensating transformer winding S3 is also connected to the base electrode 10 of the transistor 8, and the other end of the compensating transformer winding S3 is connected to an anode electrode of a rectifier 19. The cathode electrode of the rectifier 19 is connected to the cathode electrode of another rectifier 20 at electrical point 22, and the anode electrode of the rectifier 20 is connected to one end of the compensating transformer winding S4. The other end of the compensating transformer winding S4 is connected to the base electrode 14 of the transistor 12. The cathode electrode of a Zener diode 21 is connected to the junction of the cathode electrodes of the rectifiers 19 and 20 at electrical point 22, and the anode electrode of the Zener diode 21 is connected to the negative terminal of the DC voltage source 7.

A startup resistor 23 is connected between the positive terminal of the DC voltage source 7 and the base electrode 10 of the transistor 8. A transient protection network is disposed across the primary transformer winding P1 and comprises rectifiers 24 and 25, a resistor 26, and a capacitor 27. The cathode electrodes of the rectifiers 24 and 25 are connected respectively to the transistor 8 and 12 ends of the primary transformer winding P1. The cathode electrodes of the rectifiers 24 and 25 are connected together at an electrical point 28 to which one terminal each of the resistor 26 and a capacitor 27 are also connected. The other ends of the resistor 26 and of the capacitor 27 are connected to the positive terminal of the DC voltage source 7. A load 29 is disposed across the load transformer winding S5.

The operation of the basic magnetically coupled multivibrator is well known in the art, but will be reviewed briefly in this specification for the purpose of explaining the invention which exercises a modifying effect upon the natural functioning of this type of relaxation oscillator. When power is first applied to the circuit illustrated in the single figure, sufficient drive current passes through the startup resistor 23 and the base electrode 10 to the emitter electrode 11 of the transistor 8 to insure that the transistor 8 will begin to conduct. Current will therefore commence the flow from the positive terminal of the DC voltage source 7 into the center tap 6 of the primary transformer winding P1, through the left side of the primary transformer winding P1, and through the transistor 8 to the negative terminal of the DC voltage source 7. When the transistor 8 is "on," the dots adjacent the various windings of the transformer will indicate positive polarity. Thus, it is apparent that as current flows through the left-hand portion of the primary transformer winding P1, positive feedback will be realized by the induced current through the feedback transformer winding S2 to drive the transistor 8 into a higher state of conduction at a rate determined by the characteristics of the magnetic circuit. The complete path for the feedback-derived base current to the transistor 8 is from the dotted end of the feedback transformer winding S2, across the base 10 to emitter 11 electrodes of the transistor 8, from the anode to the cathode electrodes of the rectifier 17, and through the current limiting resistor 18 to the other side of the feedback transformer winding S2.

Because of the positive nature the feedback signal, the current through the left-hand portion of the primary transformer winding 1 continues to increase until the transformer core becomes saturated in one direction at which time the magnetizing inductance will become small to create a consequent rise in the magnetizing current which the transistor 8 must supply. A point is quickly reached at which the magnetizing current becomes so large that the transistor 8 is no longer able to support the load, the feedback, and the magnetizing currents. When the magnetizing current becomes so large that it demands a total collector current which the base drive current to the transistor 8 is unable to sustain, the transistor 8 is forced to drop out of saturation. When the transistor 8 drops out of saturation, its collector-emitter voltage starts rising. Consequently, the voltage across the left portion of the primary transformer winding P1 must decrease, and this change is reflected in the feedback winding S2 as a further decrease in base drive to the transistor 8.

When the voltage across the left-hand portion of the transformer winding P1, and hence all winging voltages, has dropped to zero, the increase in magnetizing current can no longer be supported and must therefore start to decay. The decay includes negative polarities at the dot-marked ends of all windings such that current flow through the feedback transformer winding S2 is from the undotted end, through the current limiting resistor 18, across the base 14 to emitter 15 electrodes of the transistor 12, and from the anode electrode to the cathode electrode of the rectifier 16 to the dotted end of the feedback transformer winding S2. As a consequence, magnetizing current begins to flow increasingly from the positive side of the DC voltage source 7 to the center tap 6 of the primary transformer winding P1, through the right side of the primary transformer winding P1, and from the collector electrode 13 to the emitter electrode 15 of the transistor 12 to the negative side of the DC voltage source 7.

It is manifest that the operation of the basic magnetically coupled multivibrator during this second half cycle is fully analogous to that described for the first half cycle and that sustained oscillation will be achieved. The periodic current reversals through the primary transformer winding P1 are, of course, inductively coupled to the load transformer winding S5 which energizes a load 28. Typically, the load transformer winding S5 is a step-up winding such that relatively high voltages appear across its terminals. The load 29 may include rectifying and filter means to change the voltage induced across the load transformer winding S5 into high voltage DC to be utilized as required.

The circuit disposed across the primary transformer winding P1 is utilized to protect the circuit elements against harmful transient voltages. Briefly, the rectifiers 24 and 25 provide full wave rectification into the electrical point 28 and cause the capacitor 27 to charge to a relatively constant voltage referenced to the positive terminal of the DC voltage source. The resistor 26 functions as a load for the full wave rectifiers 24 and 25 and provides a discharging path for the capacitor 27. Should a positive-going transient voltage appear at either end of the primary transformer winding P1, it will be transmitted through either the rectifier 24 or the rectifier 25 and absorbed by the filtering action of the capacitor 27 and the resistor 26.

It can be shown that the frequency of oscillation of a basic magnetically coupled multivibrator is approximately proportional to the DC supply voltage because almost the full supply voltage appears across each half of the primary transformer winding 1 in turn for nearly the whole of each half cycle due to the rapid saturation of the transistors while the core flux changes in an approximately linear fashion until core saturation is closely approached. To realize the objective frequency and voltage stabilization in the present invention, the compensating transformer windings S3 and S4 are utilized with the rectifiers 19 and 20 and Zener diode 21 to appropriately affect the base current drive to the transistors 8 and 12 as required to achieve frequency and voltage stabilization. It will be observed that the electrical point 22 will be maintained at a constant voltage by the Zener diode 21 so long as at least the avalanche voltage of the Zener diode 21 appears at the electrical point 22.

Consider now the case in which the DC voltage source 7 output voltage increases. The tendency would be for the multivibrator frequency to increase and for the base current drive to the transistors to increase because of the higher voltage induced into the feedback transformer winding S2. Assuming that the transistor 8 is conducting, i.e., that the dotted ends of the windings indicate positive polarity, it will be observed that a current path exists in shunt with the normal base current path. This shunt path is through the compensating transformer winding S3, and its current share increases with the assumed increase in supply voltage because it is poled to have a sapping-off effect during the half cycle when the transistor 8 is "on." The complete path of this shunt current is from the dotted end of the feedback transformer winding S2 into the undotted end of the compensating transformer winding S3, through the compensating transformer winding S3, through the rectifier 19, through the Zener diode 21, through the rectifier 17, and through the current limiting resistor 18 to the undotted end of the feedback transformer winding S2. The rectifier 20 prevents the compensating transformer winding S4 from affecting the operation of the multivibrator when the transistor 8 is conducting. During the alternate half cycles when the transistor 12 is "on," the shunted portion of the drive current supplied by the feedback transformer winding S2 passes into the dotted end of the transformer winding S4, through the rectifier 20, the Zener diode 21, and the rectifier 16 to the dotted side of the feedback transformer winding S2. The rectifier 19 prevents the compensating transformer winding S3 from affecting the operation of the multivibrator during the alternate half cycles when the transistor 12 is on.

Should the voltage supplied from the DC voltage source 7 decrease, the compensating transformer windings S3 and S4 will divert proportionally less of the total current supplied by the feedback transformer winding S2 to maintain the appropriately controlled base drive current to the transistors 8 and 12 so as to maintain a constant output voltage. It may be noted that if the supply voltage drops off to a degree at which the voltages induced alternately in the compensating transformer windings S3 and S4, considered in conjunction with the relatively small voltage drops across the base to emitter electrodes of the two transistors 8 and 12 and across the rectifiers 19 and 20, falls below the breakdown potential of the Zener diode 21, the current paths for the compensating windings S3 and S4 will be incomplete, and the circuit will behave like a conventional magnetically coupled multivibrator in that frequency will once again be approximately proportional to the supply voltage.

It will be readily apparent to those skilled in the art that, while the active switching elements shown in the single figure are NPN transistors, PNP transistors or other switching devices may be substituted with appropriate adjustment of rectifier and power supply polarities in the manner well known in the art.

What is claimed as new and is desired to secure by Letters Patent of the United States is:

1. A magnetically coupled multivibrator comprising: first and second active elements; a saturable core transformer having a plurality of windings including a primary winding in circuit with said active element and at least one feedback winding adapted to provide switching signals to said active elements; first and second compensating windings; coupling means for connecting one end of each of said first and second compensating windings to a voltage stabilized point; means for connecting the remaining end of said first compensating winding to said first active element to oppose the switching signal to said first active element; and means for connecting the remaining end of said second compensating winding to said second active element to oppose the switching signal to said second active element.

2. The magnetically coupled multivibrator of claim 1 wherein said coupling means includes a first rectifier connecting the voltage stabilized end of said first compensating winding to said voltage stabilized point and a second rectifier for connecting the voltage stablized end of said second compensating winding to said voltage stabilized point.

3. The magnetically coupled multivibrator of claim 2 wherein said voltage stabilized point is stabilized by providing a Zener diode connected between said voltage stabilized point and a terminal of DC power source utilized in energizing the magnetically coupled multivibrator.

4. A magnetically coupled multivibrator comprising a saturable core transformer having a plurality of windings including a center-tapped primary winding, a positive feedback winding, first and second compensating windings, and a load winding; first and second switching elements each including first, second, and third electrodes; means for connecting the first electrode of said first switching element to one end of said center-tapped primary winding; means for connecting the first electrode of said second switching element to the opposite end of said center-tapped primary winding; a first series circuit comprising said positive feedback winding and a resistor; means for connecting said first series circuit between the second electrode of said first switching element and the second electrode of said second switching element; a DC voltage source including first and second terminals of opposite polarity; means for connecting said first terminal to the center tap of said primary winding; means for connecting said second terminal to the third electrode of each of said first and second switching elements; means for connecting said second terminal to a first electrode of a first rectifier; means for connecting said second terminal to a first electrode of a second rectifier; means for connecting said second terminal to a first electrode of a voltage reference diode; means for connecting the second electrode of said first rectifier to the second electrode of said first active element; means for connecting the second electrode of said second rectifier to the second electrode of said second active element; a second series circuit comprising said first compensating winding, third and fourth rectifiers with like electrodes connected together to form a junction, and said second compensating winding; means for connecting said second series circuit between the second electrode of said first switching element and the second electrode of said second switching element; and means for connecting a second electrode of said voltage reference diode to the junction between the like electrodes of said third and fourth rectifiers.

5. The magnetically coupled multivibrator of claim 4 which includes; a second resistor connected between the center tap of said primary winding and the second electrode of said first active element; fifth and sixth rectifiers; means for connecting like first electrodes of said fifth and sixth rectifiers; means for connecting a second electrode of said fifth rectifier to the first electrode of said first active element; means for connecting the second electrode of said sixth rectifier to the first electrode of said second active element; and a third resistor and a capacitor connected in parallel between the center tap of said primary winding and the junction of the like first electrodes of said fifth and sixth rectifiers.

No references cited.

JOHN KOMINSKI, *Acting Primary Examiner.*

ROY LAKE, *Examiner.*

S. GRIMM, *Assistant Examiner.*